United States Patent
Kikugawa et al.

(10) Patent No.: US 6,544,914 B1
(45) Date of Patent: Apr. 8, 2003

(54) SYNTHETIC QUARTZ GLASS FOR OPTICAL MEMBER, PROCESS FOR PRODUCING THE SAME, AND METHOD OF USING THE SAME

(75) Inventors: Shinya Kikugawa, Kanagawa (JP); Yoshiaki Ikuta, Kanagawa (JP); Akio Masui, Tokyo (JP); Noriaki Shimodaira, Kanagawa (JP); Shuhei Yoshizawa, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 09/701,191

(22) PCT Filed: Mar. 27, 2000

(86) PCT No.: PCT/JP00/01869

§ 371 (c)(1),
(2), (4) Date: Dec. 28, 2000

(87) PCT Pub. No.: WO00/58231

PCT Pub. Date: Oct. 5, 2000

(30) Foreign Application Priority Data

Mar. 25, 2000 (JP) ............................................ 11-082262

(51) Int. Cl.$^7$ ................................................. C03C 3/06
(52) U.S. Cl. ........................ 501/54; 65/425; 250/492.1
(58) Field of Search ........................ 501/54; 250/492.1; 65/425

(56) References Cited

U.S. PATENT DOCUMENTS

| | | | | |
|---|---|---|---|---|
| 5,326,729 A | * | 7/1994 | Yaba et al. | 501/54 |
| 5,983,673 A | * | 11/1999 | Urano et al. | 65/30.1 |
| 6,242,136 B1 | * | 6/2001 | Moore et al. | 430/5 |
| 6,333,284 B1 | * | 12/2001 | Otsuka et al. | 501/54 |

FOREIGN PATENT DOCUMENTS

| | | | | |
|---|---|---|---|---|
| DE | 19942443 A | * | 3/2000 | |
| EP | 691 312 A | * | 1/1996 | |
| EP | 972 753 A | * | 1/2000 | |
| JP | 11292551 A | * | 10/1999 | |
| JP | WO00/41225 | | 7/2000 | |
| WO | WO-97/16382 A | * | 5/1997 | |
| WO | WO-98/52879 A | * | 11/1998 | |

* cited by examiner

*Primary Examiner*—David Sample
(74) *Attorney, Agent, or Firm*—Oblon, Spivak, McClelland, Maier & Neustadt, P.C.

(57) ABSTRACT

A process for producing a synthetic quartz glass for an optical member, which comprises a step of irradiating a synthetic quartz glass having an OH group content of 50 ppm or lower with vacuum ultraviolet light having a wavelength of 180 nm or shorter to improve the transmittance in a region of wavelengths of not longer than 165 nm.

11 Claims, 1 Drawing Sheet

SYNTHETIC QUARTZ GLASS FOR OPTICAL MEMBER, PROCESS FOR PRODUCING THE SAME, AND METHOD OF USING THE SAME

TECHNICAL FIELD

The present invention relates to a synthetic quartz glass for an optical member, a process for producing the same and a method of using the same, particularly to a synthetic quartz glass for an optical member, which shows high transmittance of vacuum ultraviolet light having a wavelength of 165 nm or shorter, a process for producing the same and a method of using the same.

BACKGROUND ART

In recent years, along with high integration of LSI, a technique for fine patterning with a narrower line width has been required in the photolithographic technology, and shortening of the wavelength of the light for exposure is being advanced. For example, the light source for a lithographic stepper has been advanced from conventional g-line (wavelength: 436 nm) or i-line (wavelength: 365 nm) to adopt a KrF excimer laser (wavelength: 248 nm) or an ArF excimer laser (wavelength: 193 nm). Further, as a light source for next generation where a finer patterning technique is required, a fluorine laser (wavelength: 157 nm) is mentioned as a prospective candidate.

In an optical system using a KrF excimer laser or an ArF excimer laser as a light source, a synthetic quartz glass is employed, since it is transparent over a wide wavelength range from a near infrared region to a vacuum ultraviolet region, and it is excellent in various properties such that the thermal expansion coefficient is very small so that it is excellent in dimensional stability, and it has high purity. However, a synthetic quartz glass having a large OH group content, which is used for a KrF excimer laser or an ArF excimer laser, has a low transmittance in a region of wavelengths of not longer than 165 nm, and as such, it is not useful for a fluorine laser which is expected to be a light source of next generation.

Further, with a synthetic quartz glass having the OH group content reduced in order to improve the transmittance in a region of wavelengths of not longer than 165 nm, the transmittance sharply decreases as the wavelength of the transmitted light becomes shorter than about 170 nm.

Accordingly, in a case where a synthetic quartz glass is to be used as an optical member in an optical system employing a fluorine laser as a light source, it will be an important subject to improve the transmittance.

Further, the optical system of an optical apparatus to be used for photolithography, is constituted by a combination of many optical members such as lenses and prisms. Accordingly, an improvement in transmittance of each individual optical member will bring about a large improvement in transmittance when integrated as an entire optical system.

However, heretofore, there has been no proposal for a method to improve the transmittance in a region of wavelengths of not longer than 165 nm which is the wavelength region of the fluorine laser or to produce a synthetic quartz glass for an optical member having high transmittance efficiently and conveniently.

The present invention has an object to provide a process whereby a synthetic quartz glass for an optical member having the transmittance in a region of wavelengths of not longer than 165 nm improved, can be produced efficiently and conveniently.

The present invention further provides a synthetic quartz glass for an optical member having a high transmittance at a wavelength of 157 nm and a method of using it.

DISCLOSURE OF THE INVENTION

The present invention provides a process for producing a synthetic quartz glass for an optical member, which comprises a step of irradiating a synthetic quartz glass having an OH group content of 50 ppm (weight ppm, the same applies hereinafter) or lower with vacuum ultraviolet light having a wavelength of 180 nm or shorter to improve the transmittance in a region of wavelengths of not longer than 165 nm.

Further, the present invention provides a synthetic quartz glass for an optical member having an absorption coefficient of at most 0.70 cm$^{-1}$ at a wavelength of 157 nm.

Still further, the present invention provides a method of using a synthetic quartz glass for an optical member, which is a method of using a synthetic quartz glass for an optical member having an OH group content of 50 ppm or lower, and which comprises a step of irradiating it with vacuum ultraviolet light having a wavelength of 180 nm or shorter before using it as an optical member.

BEST MODE FOR CARRYING OUT THE INVENTION

Figure 1:
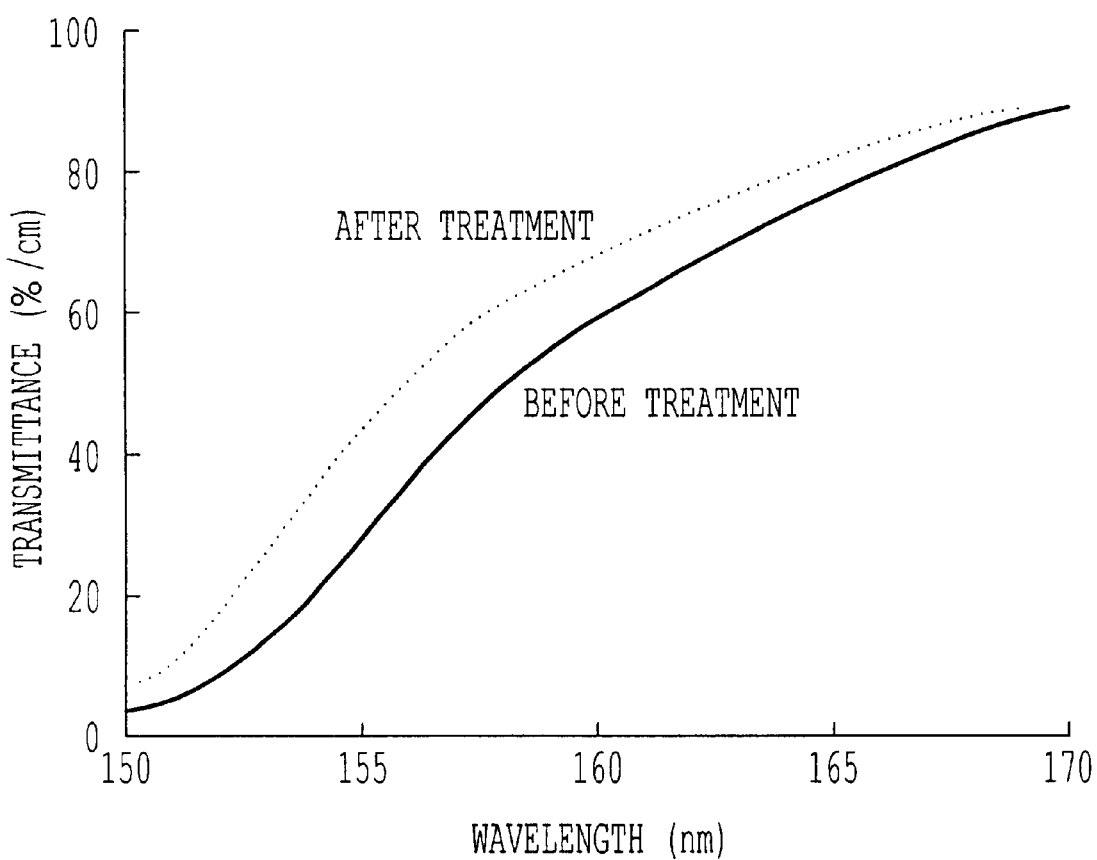
FIG. 1 is a graph showing the results of spectral transmittance measurements before and after the irradiation treatment in Example 3 of the present invention.

In the present invention, an optical member is one having a synthetic quartz glass formed into a semiproduct or a product such as a lens for an exposure apparatus (such as a projection system lens or illumination system lens), a prism (such as a beam expander in a laser beam source), an etalon, a photomask, a photomask blank, a window material or a spectral filter. Particularly, a lens, a photomask or a photomask blank is preferred. Further, the above-mentioned exposure apparatus may, for example, be an exposure apparatus for producing a semiconductor, LCD, a magnetic head or a printed circuit board.

The present inventors have found that in order to improve the transmittance at a wavelength of 165 nm or shorter of a synthetic quartz glass, if a synthetic quartz glass having the OH group content and the hydrogen molecule content controlled, is irradiated with vacuum ultraviolet light having a wavelength of 180 nm or shorter, the transmittance at a wavelength of 165 nm or shorter can be improved.

Then, they have studied an influence of the OH group content and the hydrogen molecule content in a synthetic quartz glass before the irradiation treatment (hereinafter referred to as a "non-irradiated synthetic quartz glass") over the transmittance at a wavelength of 165 nm or shorter of the synthetic quartz glass after the irradiation treatment. As a result, it has been found that the OH group content in the non-irradiated synthetic quartz glass gives an influence over the light transmittance in the vacuum ultraviolet region, so that the light transmittance decreases as the OH group content is high, but at a level of 50 ppm or lower, the transmittance at a wavelength of 165 nm or shorter can be improved by irradiation with vacuum ultraviolet light, and especially, at a level of 30 ppm or lower (further at a level of 10 ppm or lower), such a content is effective for the improvement of the transmittance at a wavelength of 165 nm or shorter.

The mechanism for such improvement of the transmittance at a wavelength of 165 nm or shorter, is not clearly understood, but may be considered as follows. There are two type of states in which OH groups are present in the synthetic quartz glass. Namely, in one state, they are present in an independent state, and in another state, they are present in such a state that adjacent OH groups are hydrogen-bonded to one another. The influence of the OH group content over the vacuum ultraviolet light transmittance varies depending upon the state of OH groups, and the former state presents a larger influence than the latter state. Namely, as compared with the transmittance of a synthetic quartz glass which contains an equivalent amount of OH groups in an independent state, the transmittance at a wavelength of 165 nm or shorter of a synthetic quartz glass containing OH groups in a hydrogen-bonded state, is higher. It is considered that most OH groups in a synthesized synthetic quartz glass are present usually in an independent state without forming hydrogen bonds, and upon irradiation with light having a wavelength of 180 nm or shorter, the state of OH groups changes into a hydrogen bond state, whereupon the transmittance at a wavelength of 165 nm or shorter is improved.

Further, when the hydrogen molecule content in the synthetic quartz glass is at least $3\times10^{16}$ molecules/cm$^3$, the vacuum ultraviolet light transmittance can be improved with a smaller quantity of ultraviolet ray irradiation. With respect to the effect for the improvement of the transmittance, there is an optimum level of ultraviolet ray irradiation. If it is too small, the transmittance will not be improved very much, and if it is too much, defects will form, and the transmittance inversely decreases. Further, hydrogen molecules in the synthetic quartz glass also have a function to suppress formation of defects such as E' centers or NBOHC. When the hydrogen molecule content is at least $1\times10^{17}$ molecules/cm$^3$, such is effective for improvement of the transmittance at a wavelength of 165 nm or shorter. Especially, when it is at least $1\times10^{18}$ molecules/cm$^3$, such is preferred from the viewpoint of the ultraviolet ray resistance (the nature whereby the transmittance will not remarkably decrease by ultraviolet ray irradiation) when it is used as a synthetic quartz glass for an optical member.

Further, in the present invention, the non-irradiated synthetic quartz glass preferably contains substantially no reduction type defects. In the present invention, the reduction type defects mean ≡Si—Si≡ and have an absorption band having a wavelength of 163 nm at the center. The internal transmittance $T_{163}$ (%/cm) at 163 nm is assumed to be represented by the following formula (3) wherein $C_{OH}$ is the OH group content (ppm) in the synthetic quartz glass.

$$T_{163}(\%/cm) \geq \exp(-0.02 C_{OH}^{0.85}) \times 100 \tag{3}$$

In the present invention, "contains substantially no reduction type defects" means that the formula (3) relating to the internal transmittance at 163 nm is satisfied.

However, if reduction type defects are present, there will be an absorption band with 163 nm at the center, whereby the actual transmittance ($T_{163}$) at the wavelength of 163 nm will be smaller than the value on the right side of the formula (3). Therefore, "containing substantially no reduction type defects" is effective to obtain a higher transmittance at a wavelength of 165 nm or shorter.

Further, fluorine may be contained in the non-irradiated synthetic quartz glass to be used in the present invention. When fluorine is contained in the non-irradiated synthetic quartz glass, fluorine is effective to reduce an instable structure in the non-irradiated synthetic quartz glass and to improve the transmittance at a wavelength of 165 nm or shorter. The fluorine content in the non-irradiated synthetic quartz glass is preferably from 100 to 2000 ppm, more preferably within a range of from 100 to 600 ppm.

Metal impurities such as alkali metals, alkaline earth metals or transition metals, in the non-irradiated synthetic quartz glass not only lower the transmittance at a wavelength ranging from an ultraviolet region to a vacuum ultraviolet region but also cause to lower the ultraviolet ray resistance, and therefore, their content is preferably as small as possible. Specifically, the total amount of metal impurities is preferably at most 100 ppb, particularly preferably at most 50 ppb.

In the present invention, the irradiation with vacuum ultraviolet light having a wavelength of 180 nm or shorter is also effective to improve the transmittance in a region of wavelengths of not longer than 165 nm by surface cleaning. The cleaning effect can be evaluated as follows.

Namely, the cleaning effect is higher as the difference between $T_a$ and $T_b$ defined by the following formulae (1) and (2), becomes smaller. Here, R is the reflectance of the synthetic quartz glass for an optical member at a wavelength of 157 nm, and n is the refractive index of the synthetic quartz glass for an optical member at a wavelength of 157 nm. $T_b$ corresponds to the theoretical transmittance.

$$T_a = (1-R)^2/(1+R)^2 \tag{1}$$

$$T_b = (1-n)^2/(1+n)^2 \tag{2}$$

Among them, the reflectance R of the synthetic quartz glass at a wavelength of 157 nm can be obtained together with the absorption coefficient a at a wavelength of 157 nm by the following calculation formula (4) by measuring in vacuum the transmittance $T_c$ at a wavelength of 157 nm including a reflection loss, of at least three sheets of the synthetic quartz glass having different thicknesses.

$$T_c = (1-R)^2 \exp(-\alpha t)/(1-R^2 \exp(-2\alpha t)) \tag{4}$$

$T_c$: The transmittance at a wavelength of 157 nm including a reflection loss

R: The reflectance at a wavelength of 157 nm

α: The absorption coefficient at a wavelength of 157 nm (1/cm)

t: The thickness of the sample (cm)

The synthetic quartz glass for an optical member of the present invention is preferably a synthetic quartz glass for an optical member, whereby the above difference between $T_a$ and $T_b$ is at most 0.03, particularly preferably at most 0.01. Further, by bringing the above difference between $T_a$ and $T_b$ to a level of at most 0.03 by irradiating a synthetic quartz glass for an optical material having an OH group content of at most 50 ppm, with vacuum ultraviolet light having a wavelength of 180 nm or shorter before using it as an optical member, the synthetic quartz glass having a high transmittance at a wavelength of 165 nm or shorter, can be used for various optical members.

In the present invention, the process for producing the non-irradiated synthetic quartz glass is not particularly limited so long as it is a process whereby the OH group content will be within the above-mentioned prescribed range. For example, a direct method, a soot method (a VAD method, an OVD method) or a plasma method may be mentioned. A soot method is particularly preferred from such a viewpoint that the temperature during the production is low, and inclusion of impurities such as chlorine and metals, can be avoided.

In the present invention, the wavelength of vacuum ultraviolet light to be irradiated is 180 nm or shorter, preferably 175 nm or shorter. Further, the vacuum ultraviolet light may be continuous light or monochromatic light.

The intensity of the vacuum ultraviolet light to be irradiated is preferably at least 1 mJ/cm$^2$. In order to obtain the effect in a shorter period of time, 5 mJ/cm$^2$ or higher is preferred. The irradiation time is suitably determined depending upon the light source. If the total irradiation energy amount of ultraviolet light is too small, the transmittance will not be substantially improved. On the other hand, if it is too much, defects will form, and the transmittance may inversely decrease. Usually, the total irradiation energy amount is preferably from about 300 to 50000 J/cm$^2$. The total irradiation energy amount is preferably at least 1000 mJ/cm$^2$, particularly preferably at least 3000 mJ/cm$^2$. If the hydrogen molecule content is high, even if the total irradiation energy amount of ultraviolet light is large, defects tend to hardly form.

The atmosphere for irradiation treatment is preferably a nitrogen atmosphere or a He atmosphere, since if oxygen molecules, moisture, etc. are contained in a large amount in the atmosphere, they tend to absorb the vacuum ultraviolet light.

As a specific example of the vacuum ultraviolet light source, a xenon excimer lamp (main wavelength: 172 nm) using xenon as a medium, or a fluorine laser (main wavelength: 157 nm) using fluorine as a medium, may, for example, be mentioned. In a case where improvement of the transmittance at a wavelength of 165 nm or shorter is required over a wide range, a xenon excimer lamp is preferred. Whereas, from the viewpoint of the productivity, a fluorine laser is preferred.

In the present invention, the irradiation treatment may be carried out at any stage before or after each step during the process for forming the synthetic quartz glass into an optical member. Here, each step means, for example, a heating step, a cutting step, a polishing step or a finishing step. The irradiation treatment may be carried out after completion of the optical member. Further, the irradiation treatment may be applied only to the light transmitting region (the region corresponding to the light path for transmission of light). When the irradiation treatment is carried out for the purpose of surface cleaning, it is preferred to carry out the irradiation treatment before, particularly preferably immediately before, use as an optical member.

In the present invention, the synthetic quartz glass for an optical member preferably has an absorption coefficient of at most 0.70 cm$^{-1}$ at a wavelength of 157 nm. More preferably, the absorption coefficient at a wavelength of 157 nm is at most 0.30 cm$^{-1}$.

Further, it is preferably one having an infrared absorption peak attributable to stretching vibration of a SiOH group at about 3640 cm$^{-1}$.

Now, the present invention will be described in further detail with reference to Examples. However, the present invention is by no means restricted by these Examples.

EXAMPLE 1

Fine particles of quartz glass formed by heat hydrolysis in an oxyhydrogen flame of $SiCl_4$, were deposited on a substrate by a known soot method, to prepare a porous quartz glass body having a diameter of 35 cm and a length of 100 cm. The obtained porous quartz glass body was set in an electric furnace capable of controlling the atmosphere, and the pressure was reduced to 10 Torr at room temperature and maintained for 1 hour, whereupon a mixed gas of He/SiF$_4$= 99/1 (volume ratio) was introduced until the pressure became normal pressure. In this atmosphere, fluorine doping was carried out by maintaining the system at normal pressure and room temperature. Then, the temperature was raised to 1450° C. in an atmosphere of 100% He, and the system was maintained at this temperature for 5 hours to obtain a fluorine-containing transparent glass body.

From the obtained transparent quartz glass body, a disc-shaped block of 100φ×30 mm was cut out. The block was maintained for 250 hours in an atmosphere of 100% hydrogen under 10 atm at 500° C. to carry out hydrogen doping treatment to obtain a non-irradiated synthetic quartz glass. The OH group content and the hydrogen molecule content of the obtained synthetic quartz glass were 4.8 ppm and 17.4× 10$^{17}$ molecules/cm$^3$, respectively. Further, by the above-mentioned formula (3), presence or absence of reduction type defects was evaluated, whereby it was confirmed that substantially no reduction type defects were contained.

Further, both sides of the disc-shaped synthetic quartz glass were subjected to optical polishing, and then irradiation treatment was applied for 650 hours under a nitrogen atmosphere by a xenon excimer lamp (main wavelength: 172 nm) (total irradiation energy amount: about 13000 J/cm$^2$) to obtain a synthetic quartz glass for an optical member.

At that time, the absorption coefficient for ultraviolet light having a wavelength of 157 nm ("the absorption coefficient for ultraviolet light having a wavelength of 157 nm" will be hereinafter referred to simply as "the absorption coefficient at a wavelength of 157 nm") of the synthetic quartz glass before and after the irradiation treatment, and the position (cm$^{-1}$) of the infrared absorption peak attributable to SiOH stretching vibration ("the infrared absorption peak attributable to SiOH stretching vibration" will be hereinafter referred to simply as the SiOH absorption peak) of the synthetic quartz glass after the irradiation, were measured.

EXAMPLE 2

In the same manner as in Example 1, a non-irradiated synthetic quartz glass which had an OH group content of 19 ppm and a hydrogen molecule content of 10.3×10$^{17}$ molecules/cm$^3$ and which contained substantially no reduction type defects, was prepared and irradiated with a fluorine laser in a nitrogen atmosphere to obtain a synthetic quartz glass for an optical member. The irradiation condition was 10 mJ/cm$^2$×40 Hz×150 min. At that time, the absorption coefficient at a wavelength of 157 nm of the synthetic quartz glass before and after the irradiation treatment, and the position (cm$^{-1}$) of the SiOH absorption peak of the synthetic quartz glass after the irradiation, were measured.

EXAMPLE 3

In the same manner as in Example 1, a non-irradiated synthetic quartz glass which had an OH group content of 31 ppm and a hydrogen molecule content of 2.1×10$^{17}$ molecules/cm$^3$ and which contained substantially no reduction type defects, was prepared, and irradiation treatment was carried out for 650 hours in a nitrogen atmosphere by an excimer lamp using xenon as a medium (total irradiation energy amount: about 13000 J/cm$^2$) to obtain a synthetic quartz glass for an optical member. At that time, the absorption coefficient at a wavelength of 157 nm of the synthetic quartz glass before and after the irradiation treatment, and the position (cm$^{-1}$) of the SiOH absorption peak of the synthetic quartz glass after the irradiation, were measured.

EXAMPLE 4

In the same manner as in Example 1, a non-irradiated synthetic quartz glass which had an OH group content of 33 ppm and a hydrogen molecule content of $0.8 \times 10^{17}$ molecules/cm$^3$ and which contained substantially no reduction type defects, was prepared, and irradiation treatment was applied for 650 hours in a nitrogen atmosphere by a xenon excimer lamp (total irradiation energy amount: about 13000 J/cm$^2$). At that time, the absorption coefficient at a wavelength of 157 nm of the synthetic quartz glass before and after the irradiation, and the position (cm$^{-1}$) of the SiOH absorption peak of the synthetic quartz glass after the irradiation, were measured.

EXAMPLE 5

In the same manner as in Example 1, a non-irradiated synthetic quartz glass which had an OH group content of 54 ppm and a hydrogen molecule content of $32.5 \times 10^{17}$ molecules/cm$^3$ and which contained substantially no reduction type defects, was prepared, and irradiation treatment was applied for 1000 hours in a nitrogen atmosphere by a xenon excimer lamp (total irradiation energy: about 20000 J/cm$^2$). At that time, the absorption coefficient at a wavelength of 157 nm of the synthetic quartz glass before and after the irradiation, and the position (cm$^{-1}$) of the SiOH absorption peak of the synthetic quartz glass after the irradiation, were measured.

EXAMPLE 6

In the same manner as in Example 1, a non-irradiated synthetic quartz glass which had an OH group content of 63 ppm and a hydrogen molecule content of $0.5 \times 10^{17}$ molecules/cm$^3$ and which contained substantially no reduction type defects, was prepared, and irradiation treatment was applied for 1000 hours in a nitrogen atmosphere by a xenon excimer lamp (total irradiation energy: about 20000 J/cm$^2$). At that time, the absorption coefficient at a wavelength of 157 nm of the synthetic quartz glass before and after the irradiation, and the position (cm$^{-1}$) of the SiOH absorption peak of the synthetic quartz glass after the irradiation, were measured.

EXAMPLE 7

In the same manner as in Example 1, a non-irradiated synthetic quartz glass which had an OH group content of 5.2 ppm and a hydrogen molecule content of $17.4 \times 10^{17}$ molecules/cm$^3$ and which contained substantially no reduction type defects, was prepared, and irradiation treatment was applied for 75 hours in a nitrogen atmosphere by a xenon excimer lamp (total irradiation energy amount: about 1500 J/cm$^2$). At that time, the absorption coefficient at a wavelength of 157 nm of the synthetic quartz glass before and after the irradiation treatment, and the position (cm$^{-1}$) of the SiOH absorption peak of the synthetic quartz glass after the irradiation, were measured.

EXAMPLE 8

In the same manner as in Example 1, a non-irradiated synthetic quartz glass which had an OH group content of 12 ppm and a hydrogen molecule content of $10.3 \times 10^{17}$ molecules/cm$^3$ and which contained substantially no reduction type defects, was prepared, and irradiation treatment was applied for 75 hours in a nitrogen atmosphere by a xenon excimer lamp (total irradiation energy amount: about 1500 J/cm$^2$). At that time, the absorption coefficient at a wavelength of 157 nm of the synthetic quartz glass before and after the irradiation treatment, and the position (cm$^{-1}$) of the SiOH absorption peak of the synthetic quartz glass after the irradiation, were measured.

EXAMPLE 9

In the same manner as in Example 1, a non-irradiated synthetic quartz glass which had an OH group content of 32 ppm and a hydrogen molecule content of $0.8 \times 10^{17}$ molecules/cm$^3$ and which contained substantially no reduction type defects, was prepared, and irradiation treatment was applied for 75 hours in a nitrogen atmosphere by a xenon excimer lamp (total irradiation energy amount: about 1500 J/cm$^2$). At that time, the absorption coefficient at a wavelength of 157 nm of the synthetic quartz glass before and after the irradiation treatment, and the position (cm$^{-1}$) of the SiOH absorption peak of the synthetic quartz glass after the irradiation, were measured.

EXAMPLE 10

In the same manner as in Example 1, a non-irradiated synthetic quartz glass which had an OH group content of 5.2 ppm and a hydrogen molecule content of $17.4 \times 10^{17}$ molecules/cm$^3$ and which contained substantially no reduction type defects, was prepared, and irradiation treatment was applied for 35 hours in a nitrogen atmosphere by a xenon excimer lamp (total irradiation energy amount: about 700 J/cm$^2$). At that time, the absorption coefficient at a wavelength of 157 nm of the synthetic quartz glass before and after the irradiation treatment, and the position (cm$^{-1}$) of the SiOH absorption peak of the synthetic quartz glass after the irradiation, were measured.

EXAMPLE 11

In the same manner as in Example 1, a non-irradiated synthetic quartz glass which had an OH group content of 5.2 ppm and a hydrogen molecule content of $17.4 \times 10^{17}$ molecules/cm$^3$ and which contained substantially no reduction type defects, was prepared, and irradiation treatment was applied for 300 hours in a nitrogen atmosphere by a xenon excimer lamp (total irradiation energy amount: about 6000 J/cm$^2$). At that time, the absorption coefficient at a wavelength of 157 nm of the synthetic quartz glass before and after the irradiation treatment, and the position (cm$^{-1}$) of the SiOH absorption peak of the synthetic quartz glass after the irradiation, were measured.

Evaluation Method

From the center portion of the obtained block of the synthetic quartz glass for an optical member, a sample for evaluation of 30ϕ×10 mm, was cut out and polished. Then, the hydrogen molecule content, the OH group content, the SiOH absorption peak and the absorption coefficient at a wavelength of 157 nm, were obtained by the following methods.

Hydrogen molecule content) Raman spectrometry was carried out, and the hydrogen molecule content (molecules/cm$^3$) was obtained from the intensity ratio ($=I_{4135}/I_{800}$) of the intensity $I_{4135}$ detected from the scattering peak at 4135 cm$^{-1}$ of the laser Raman spectrum to the intensity $I_{800}$ of the scattering peak at 800 cm$^{-1}$ representing the fundamental vibration between silicon and oxygen (V. S. Khotimchenko et a., Zhurnal Prikladnoi Spektroskopii, 46(6), 987–997 (1986)).

OH group content and Si—OH absorption peak) If a common synthetic quartz glass contains OH groups, a peak at 3673 cm$^{-1}$ will appear in the transmission spectrum by the infrared spectroscopy. From the absorption of this peak, the substantial peak height (H) is obtained, and further, the thickness (L, unit: cm) of the synthetic quartz glass, through which infrared light passes during the measurement, is obtained, whereupon the OH group content s obtained from the following formula.

OH group content (ppm)=95×H/L

This technique is called β-OH and is commonly used to obtain the OH group content in glass (for example, J. P. Wiiliams et al., Ceram.Bull., 55(5), 524 (1976)).

Absorption coefficient at a wavelength of 157 nm) Using a vacuum ultraviolet spectrophotometer, the transmittances at a wavelength of 157 nm of a sample having a thickness of 10 mm and a sample having a thickness of 2 mm were measured, and from these transmittances, the absorption coefficient at a wavelength of 157 nm was calculated. The smaller the value of the absorption coefficient at a wavelength of 157 nm, the higher the transmittance. The results of measurements of spectrum transmittance before and after the vacuum ultraviolet light irradiation treatment in Example 3, are shown in FIG. 1.

The evaluation results of Examples 1 to 11 are summarized in Table 1. Examples 5 and 6 are examples wherein in the absorption coefficients at a wavelength of 157 nm are large, since the OH group contents are large. Further, Example 4 is an example wherein the total irradiation energy amount of ultraviolet light was large in spite of a small hydrogen molecule content, whereby defects formed, and the absorption coefficient at a wavelength of 157 nm increased by ultraviolet light irradiation.

TABLE 1

| Example | OH group content (ppm) | Hydrogen molecule content (× $10^{17}$ molecules/ cm$^3$) | Absorption coefficient at a wavelength of 157 nm Before irradiation | Absorption coefficient at a wavelength of 157 nm After irradiation | SiOH absorption peak |
|---|---|---|---|---|---|
| 1 | 4.8 | 17.4 | 0.223 | 0.196 | 3642 |
| 2 | 19 | 10.3 | 0.565 | 0.293 | 3641 |
| 3 | 31 | 2.1 | 0.787 | 0.574 | 3643 |
| 4 | 33 | 0.8 | 0.821 | 0.831 | 3673 |
| 5 | 54 | 32.5 | 1.146 | 0.976 | 3642 |
| 6 | 63 | 0.5 | 1.272 | 1.742 | 3643 |
| 7 | 5.2 | 17.4 | 0.230 | 0.171 | 3640 |
| 8 | 12 | 10.3 | 0.485 | 0.292 | 3641 |
| 9 | 32 | 0.8 | 0.811 | 0.697 | 3640 |
| 10 | 5.2 | 17.4 | 0.240 | 0.203 | 3648 |
| 11 | 5.2 | 17.4 | 0.240 | 0.186 | 3640 |

EXAMPLES 12 TO 16

With respect to the synthetic quartz glass having an OH group content of 1.5 ppm, five samples were prepared for each of four different sizes differing in the thickness i.e. 25 mmφ×2 mm in thickness, 25 mmφ×10 mm in thickness, 25 mmφ×20 mm in thickness and 25 mmφ×30 mm in thickness. With respect to each sample, the opposing two surfaces of 25 mmφ were mirror-polished with a precision of a surface roughness of at most 5 Å and a parallel plane degree of at most 10 seconds. These samples were wet-washed in the following order.

1) Immersed for 10 minutes in a mixed liquid (liquid temperature: 100° C.) in a ratio of sulfuric acid:aqueous hydrogen peroxide solution:water=1:1:8.
2) Subjected to running water rinsing for 5 minutes with deionized water.
3) Immersed for 10 minutes in a mixed liquid (liquid temperature: 25° C.) in a ratio of ammonia:aqueous hydrogen peroxide solution:water=1:1:8.
4) Subjected to running water rinsing for 5 minutes with deionized water.
5) Subjected to ultrasonic cleaning for 10 minutes with deionized water (liquid temperature: 40° C.)
6) Flon vapor drying Then, the sample was irradiated with a xenon excimer lamp light (illumination intensity: 10 mW/cm$^2$) in a nitrogen gas atmosphere under the conditions as shown in Table 2 to carry out cleaning for various irradiation times. After dry system cleaning, the sample was immediately set in a vacuum ultraviolet spectrophotometer (UV201M, manufactured by Bunko Keiki), and the transmittance at a wavelength of 157 nm was measured in a nitrogen atmosphere. By inserting the transmittance $T_1$, $T_2$, $T_3$ or $T_4$ at a wavelength of 157 nm of a sample having a thickness of 2 mm (=$t_1$), 10 mm (=$t_2$), 20 mm (=$t_3$) or 30 mm (=$t_4$), obtained by the measurement, the reflectance R at a wavelength of 157 nm and the absorption coefficient α at a wavelength of 157 nm were obtained by a least squares method.

$$T_i=(1-R)^2\exp(-\alpha t_i)/(1-R^2\exp(-2\alpha t_i)) \quad (5)$$

(i=1, 2, 3, 4)

$T_i$: Transmittance at a wavelength of 157 nm including reflection loss

R: Reflectance at a wavelength of 157 nm

α: absorption coefficient at a wavelength of 157 nm (1/cm)

$t_i$: Thickness of the sample (cm)

Using the reflectance R at a wavelength of 157 nm, thus obtained, the transmittance $T_a$ was obtained by the formula (1), and the difference ΔT (=$T_b$-$T_a$) from the theoretical transmittance $T_b$ (=0.884) calculated by the formula (2) from the refractive index n (=1.661) at a wavelength of 157 nm, was obtained, whereby the cleaning degree of the surface was evaluated. The results are shown in Table 2.

TABLE 2

| Irradiation time | Example 12 No irradiation | Example 13 3 min | Example 14 10 min | Example 15 30 min | Example 16 60 min |
|---|---|---|---|---|---|
| $T_1$ | 80.0 | 83.8 | 86.0 | 86.2 | 86.4 |
| $T_2$ | 73.7 | 77.3 | 79.3 | 79.5 | 79.7 |
| $T_3$ | 66.6 | 69.9 | 71.8 | 71.9 | 72.0 |
| $T_4$ | 60.2 | 63.2 | 65.0 | 65.0 | 65.1 |
| α | 0.1 | 0.1 | 0.1 | 0.1 | 0.1 |
| R | 0.101 | 0.079 | 0.065 | 0.064 | 0.063 |
| $T_a$ | 0.817 | 0.855 | 0.878 | 0.880 | 0.881 |
| ΔT | 0.067 | 0.029 | 0.006 | 0.004 | 0.003 |

INDUSTRIAL APPLICABILITY

According to the present invention, a synthetic quartz glass for an optical component having an improved transmittance at a wavelength of 165 nm or shorter, can be produced highly efficiently and conveniently.

What is claimed is:

1. A method of using a synthetic quartz glass for an optical member having an OH group content of 50 ppm or lower comprising:
   irradiating the synthetic quartz glass with vacuum ultraviolet light having a wavelength of 180 nm or shorter to improve the transmittance in a region of wavelengths of not longer than 165 nm before using it as the optical member.

2. The method according to claim 1, wherein the hydrogen molecule content of the synthetic quartz glass is at least 1×10$^{17}$ molecules/cm$^3$.

3. The method according to claim 2, wherein the vacuum ultraviolet light having a wavelength of 180 nm or shorter, is light of xenon excimer lamp (main wavelength: 172 nm).

4. The method according to claim 2, wherein the vacuum ultraviolet light having a wavelength of 180 nm or shorter, is light of fluorine laser (main wavelength: 157 nm).

5. The method according to claim 2, wherein a synthetic quartz glass containing substantially no reduction type defects, is used.

6. The method according to claim 1, wherein the vacuum ultraviolet light having a wavelength of 180 nm or shorter, is light of xenon excimer lamp (main wavelength: 172 nm).

7. The method according to claim 6, wherein a synthetic quartz glass containing substantially no reduction type defects, is used.

8. The method according to claim 1, wherein the vacuum ultraviolet light having a wavelength of 180 nm or shorter, is light of fluorine laser (main wavelength: 157 nm).

9. The method according to claim 8, wherein a synthetic quartz glass containing substantially no reduction type defects, is used.

10. The method according to claim 1, wherein a synthetic quartz glass containing substantially no reduction type defects, is used.

11. The method according to claim 1, wherein after irradiating the glass with vacuum ultraviolet light having a wavelength of 180 nm or shorter, the difference between Ta and Tb as defined by the following formulae (1) and (2) is at most 0.03, provided that R is the reflectance of the synthetic quartz glass for an optical member at a wavelength of 157 nm, and n is the refractive index of the synthetic quartz glass for an optical member at a wavelength of 157 nm:

$$Ta = (1-R)^2/(1+R)^2 \qquad (1)$$

$$Tb = (1-n)^2/(1+n)^2 \qquad (2).$$

* * * * *